Dec. 2, 1969 C. A. NEUGEBAUER 3,481,778

METHOD OF FORMING A SUPERCONDUCTING METALLIC FILM

Filed June 1, 1964 2 Sheets-Sheet 1

Inventor:
Constantine A. Neugebauer,
by Paul R. Webb, II
His Attorney.

METHOD OF FORMING A SUPERCONDUCTING METALLIC FILM

Filed June 1, 1964 2 Sheets-Sheet 2

Inventor:
Constantine A. Neugebauer,
by Paul R. Webb, II
His Attorney.

United States Patent Office 3,481,778
Patented Dec. 2, 1969

3,481,778
METHOD OF FORMING A SUPERCONDUCTING METALLIC FILM

Constantine A. Neugebauer, Schenectady, N.Y., assignor to General Electric Company, a corporation of New York Continuation-in-part of application Ser. No. 331,034, Dec. 16, 1963. This application June 1, 1964, Ser. No. 372,738
The portion of the term of the patent subsequent to Apr. 1, 1986, has been disclaimed
Int. Cl. B44d *1/18;* C23c *13/02*
U.S. Cl. 117—213 3 Claims This invention relates to methods of forming metallic films on substrates and more particularly to methods of forming superconductive vanadium-gallium metallic films on substrates which films exhibit superconductivity when cooled below their critical temperatures.

This application is a continuation-in-part of my copending application, Serial No. 331,034, filed Dec. 16, 1963, now abandoned. This application is assigned to the same assignee as my above copending application.

As is well known, superconduction is a term describing the type of electrical current conduction existing in certain materials cooled below their critical temperture, $T_c$, where resistance to the flow of current is essentially nonexistent. While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in computers, generators, direct current motors and low frequency transformers, and to advances in cryogenics which removed many of the economic and scientific problems involved in extremely low temperature operations. Superconductive compounds are of particular interest because they provide frequently very high critical temperatures.

In my copending application Serial No. 311,935, filed Sept. 3, 1963, now Patent No. 3,328,200 which is assigned to the same assignee as the present application, there is disclosed and claimed a method of forming a superconductive compound on a substrate. This method comprises positioning at least one substrate within a chamber, evacuating the chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within the chamber, positioning a second metal within the chamber, heating at least a part of the first superconductive metal to at least its melting point, heating the substrate to a temperature in excess of 25° C., evaporating an initial portion of the first resulting molten metal within the chamber thereby getting oxygen and oxygen containing compounds therein, subsequently evaporating an additional portion of the molten metal and condensing on the substrate a first superconductive layer, heating the second metal to its evaporation temperature, evaporating at least a portion of the second metal on the first layer, and heating the substrate with its evaporated metals thereby forming on the substrate a metallic compound film exhibiting superconductivity. The present invention is directed to an improved method of forming superconductive metallic films including metallic compound films on substrates which films exhibit superconductivity when cooled below the critical temperatures of the corresponding bulk materials.

In my copending application Serial No. 372,737 filed

June 1, 1964, now Patent No. 3,436,256, which is assigned to the same assignee as the present application, there is disclosed and claimed a method of forming a superconductive metallic film. This method comprises coevaporating a first high melting point superconductive metal and a second lower melting point superconductive metal in a pressure range of $1\times10^{-9}$ to $5\times10^{-5}$ millimeters of mercury onto a substrate. The metals are coevaporated in particular ratios; the substrates are maintained in particular temperature ranges; or both particular ratios and substrate temperature conditions are employed.

It is an object of my invention to provide a method of forming a superconductive vanadium-gallium metallic film on a substrate.

It is another object of my invention to provide a method of forming a superconductive vanadium-gallium metallic film on a substrate by coevaporation.

It is another object of my invention to provide a method of forming a superconductive vanadium-gallium metallic film on a substrate by coevaporating a metal containing vanadium and a gallium metal onto the substrate.

In carrying out my invention in one form, a method of forming a superconductive vanadium-gallium metallic film on a substrate comprises positioning at least one substrate within a chamber, evacuating said chamber to a pressure in the range of $1\times10^{-9}$ to $5\times10^{-5}$ millimeters of mercury, positioning a metal member containing vanadium within the chamber, positioning a gallium metal within the chamber, heating at least a part of the vanadium metal member to at least its melting point, evaporating an initial portion of the resulting molten vanadium metal within the chamber thereby gettering oxygen and oxygen containing compounds therein, heating the gallium metal to its evaporation temperature, heating the substrate to a temperature above 500° C., subsequently evaporating an additional portion of the molten vanadium metal and condensing the molten vanadium metal on the substrate, and coevaporating at least a portion of the gallium metal and condensing the gallium metal simultaneously on the substrate in a ratio higher than 1 to 3 to vanadium thereby forming on the substrate a superconductive metallic film.

These and various other objects, features and advantages of the invention will be better understood from the following description taken in connection with the accompanying drawings in which.

Figure 1:
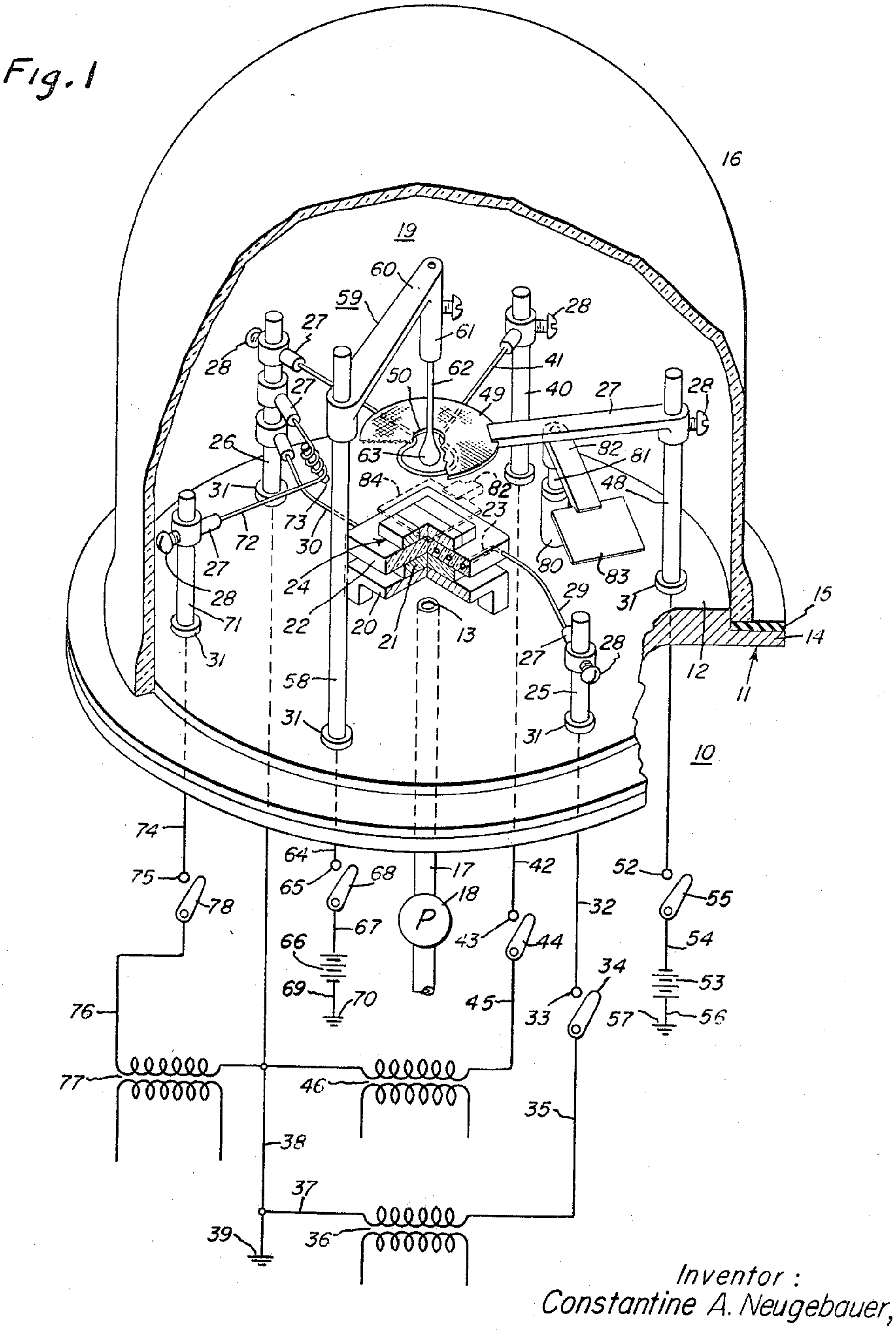
FIGURE 1 is a sectional view of apparatus for forming superconductive metallic films on substrates in accordance with my invention.

In FIGURE 1 of the drawing, apparatus is shown generally at 10 for forming superconductive vanadium-gallium metallic films on substrates. A metal base 11 has a raised center portion 12 with a central aperture 13 therein and an outer rim 14 on which is positioned a rubber gasket 15. A glass bell jar 16 is positioned on gasket 15 adjacent the edge of center portion 12 of base 11. An evacuation line 17 is connected to aperture 13 and to a pump 18 to evacuate a chamber 19 defined by jar 16 and center portion 12 of base 11.

A metal member 20 including support legs is positioned over aperture 13. A block 21, such as, of quartz, mica or Vycor, a refractory material manufactured by Corning Glass Works, Corning, N.Y., is located on the top surface of member 20 to provide electrical insulation. A member 22 of quartz, mica or Vycor, which has a plurality of heating wires 23 embedded therein, is positioned on the upper surface of block 21 and extends beyond the edges of member 20 to prevent shorting during operation of the apparatus. A plurality of substrates 24 are arranged on the upper surface of member 22. Such substrates can be of various metallic and non-metallic materials. For example, tungsten, stainless steel, quartz, mica, magnesium oxide, and soda-lime glass are suitable.

A pair of rods 25 and 26 each have an adjustable arm 27 with a set screw 28 to support leads 29 and 30 connected to heating wires 23. Each rod is supported in an electrically insulating sleeve 31 positioned in an aperture in portion 12 of base 11. A lead 32 from rod 31 has a terminal 33 which is contacted by a switch 34. A lead 35 is connected from a variable transformer 36 to switch 34. A second lead 37 is connected to a lead 38 grounded at 39. Lead 38 is connected to rod 26. Transformer 36, which is connected to a 115 volt A.C. current source, provides a 0–40 volt, 0–5 ampere range power source to heat wires 23 in member 22. The temperature of substrates 24 can be heated in this manner to values in excess of 1000° C.

A rod 40 supported in an electrically insulating sleeve 31 is also provided with an adjustable arm 27. A second arm 27 of rod 26 and arm 27 of rod 40 support a wire 41, for example, of tungsten therebetween. Wire 41 is shown in V-shape with a loop at the base of the V. A lead 42 from rod 40 has a terminal 43 which is contacted by a switch 44. A lead 45 is connected from a transformer 46 to switch 49. Another lead 47 connects transformer 46 to lead 38 which is grounded at 39. Lead 38 is connected to rod 26. Transformer 46, which is connected to a 115 volt A.C. current source, provides a 16 volt, 18 ampere power source for wire 41.

A rod 48 supported in an insulating sleeve 31 carries an adjustable arm 27 which positions a molybdenum wire mesh screen 49 above the loop of wire 41. An aperture 50 is located in the center of screen 49 which aperture is in axial alignment with the opening in the loop of wire 41. A lead 51 connects rod 48 to a terminal 52. The negative terminal of a D.C. power supply 53, for example, a 500 volt D.C. supply, is connected by a lead 54 to a switch 55 which contacts terminal 52. A lead 56 connects the positive terminal of power supply 53 to a ground 57. In this manner, screen 49 carries a potential of minus 500 volts.

A rod 58 supported in a sleeve 31 carries an L-shaped member 59 which has a portion 60 mounted adjustably on rod 58 by means of a set screw 28. A portion 61 of member 59 holds a rod 62 of a high melting point superconducting metal, such as vanadium by means of a set screw 28. Rod 62 is a metallic member containing vanadium including a metallic member of vanadium. At the free end of rod 62, there is shown a globule 63 of vanadium which was formed during a previous melting of the tip of rod 62. Rod 62 is positioned within aperture 51 of screen 49 and the opening in the loop of wire 41 so that globule 62 is located slightly above or within the loop of wire 41. A lead 64 connects rod 58 to a terminal 65. The positive terminal of a 300 milliamperes, 3000 volts variable D.C. power supply 66 is connected by a lead 67 to a switch 68 which contacts terminal 65. A lead 69 connects power supply 66 to a ground 70.

A rod 71 supported in a sleeve 31 has an arm 27 adjusted by a set screw 28. Arm 27 supports a molybdenum wire 72 with a heating coil at its midpoint. A globule 73 of gallium is contained within the coil. The other end of wire 72 is carried by a third arm 27 on rod 26. A lead 74 connects rod 71 to a terminal 75. A lead 76 connects a variable transformer 77 to a switch 78 adapted to contact terminal 75. A lead 79 connects transformer 77 to lead

38 which is grounded at 39. Lead 38 is connected to rod 26.

An insulating sleeve 80 positions a pivotal rod 41 with an arm 82 supported thereon. Rod 81 is moved from outside chamber 19 by any suitable means (not shown). Arm 82 secures a shield 83 in the form of a flat molybdenum sheet which is pivoted to a position shown by dotted lines 84.

Figure 2:
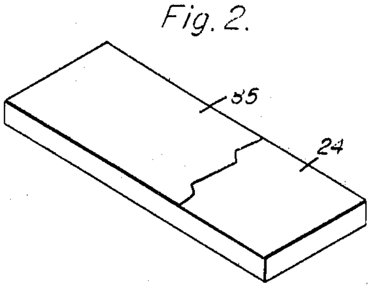
FIGURE 2 is a perspective view of a substrate with a superconductive metallic film thereon.

In FIGURE 2 of the drawing, there is shown a metallic substrate 24 as is disclosed in FIGURE 1 of the drawing. For example, this substrate 24 is made of tungsten. A superconductive metallic compound film 85 containing vanadium-gallium, $V_3Ga$, is shown coevaporated onto at least one surface of substrate 24.

Figure 3:
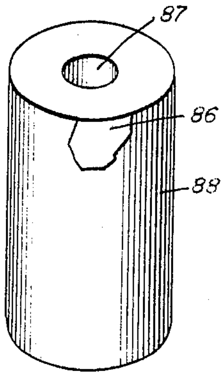
FIGURE 3 is a perspective view of a modified substrate with a superconductive metallic film thereon.

In FIGURE 3 of the drawing, there is shown a cylinder 86 of tungsten with a central aperture 87 therethrough. The exterior side wall of cylinder 86 has a superconductive metallic film 88 containing vanadium-gallium, $V_3Ga$, thereon. The rod was revolved around its axis during the evaporation of the film thereon.

I discovered that a superconductive metallic film could be coevaporated onto a substrate by positioning a substrate within a chamber, evacuating the chamber to a pressure in the range of $1\times10^{-9}$ to $5\times10^{-5}$ millimeters of mercury, positioning a metal member containing vanadium within the chamber, positioning a gallium metal within the chamber, heating at least a part of the vanadium metal member to at least its melting point, evaporating an initial portion of the resulting molten vanadium metal within the chamber thereby gettering oxygen and oxygen containing compounds therein, heating the gallium metal to its evaporation temperature, heating the substrate to a temperature above 500° C., subsequently evaporating an additional portion of the molten vanadium metal and condensing the molten vanadium metal on the substrate, and coevaporating at least a portion of the gallium metal and condensing the gallium metal simultaneously on the substrate in a ratio higher than 1 to 3 to vanadium thereby forming on the substrate a superconductive metallic film.

I found that vanadium metal is suitable for evaporation in accordance with my method. Secondly, this metal can be contained in a metallic member such as a vanadium-tungsten member. I found that it is necessary to heat at least a part of this metal to at least its melting point or higher. This can be done by electron bombardment or by induction heating to produce a high rate of initial and subsequent evaporation.

I found that gallium metal is suitable for coevaporation with vanadium metal in accordance with my method. Such metal is heated to its evaporation temperature. This is accomplished, for example, by containing a globule of the metal within a heating coil.

I found that various metallic and non-metallic materials provided suitable substrates for coevaporating such a superconducting film thereon. For example, tungsten, stainless steel, quartz, mica, magnesium oxide, and soda-lime glass can be employed.

If electron bombardment or induction heating is used in the process to produce a high rate of initial and subsequent evaporation, a higher residual gas pressure can be tolerated since the deposition rate is high. I found further that when an evacuation pressure range of $1\times10^{-9}$ to $5\times10^{-5}$ millimeters of mercury is employed, it is necessary that the oxygen and oxygen containing compounds such as $H_2O$, CO and $CO_2$ be gettered or removed from the chamber. The first higher temperature superconductive metal to be evaporated is employed in a sufficiently pure form to eliminate the production of additional oxygen or oxygen containing compounds. Secondly, the evacuation system is also checked to be certain that there are no large leaks into the chamber where the evaporation process is taking place.

If evaporation takes place in a chamber where oxygen or the oxygen containing compounds have not been reduced to a low level, a film of superconductive material can be evaporated onto a substrate but the film will not be superconducting when lowered to a temperature below the critical temperature of the corresponding bulk material because of its relatively high impurity content.

The rapid evaporation of the first superconductive metal to be deposited and oxygen gettering by the material to be evaporated will produce a film which is super-conducting when lowered below the critical temperature of the corresponding bulk material. This rapid evaporation and oxygen gettering are employed in the following manners to produce a superconductive film. The vanadium metal to be evaporated is not confined within an enclosure within the chamber but the material is allowed to evaporate over a large area. In this manner, I have found that the material which is evaporated over this large area getters the oxygen and the oxygen containing compounds in the chamber. While the initial portion of the vanadium metal evaporated onto the substrate and onto the interior of the chamber is contaminated, by the time the subsequent coevaporation with the gallium metal which is continuous with or interrupted from the initial evaporation of the first superconductive metal, the level of oxygen and oxygen containing compounds has been reduced to a tolerable level and will produce a metallic film on the substrate which is superconductive.

Such oxygen gettering can also be accomplished in at least one other manner. A shield of metal, such as molybdenum, is positioned between the substrate and the vanadium metal to be evaporated within the evacuated chamber. The evacuation of the vanadium metal is commenced whereupon the metal will evaporate on both the shield and a substantial portion of the interior of the chamber without any deposit on the substrate. The evaporated metal will getter the oxygen and the oxygen containing compounds present in the chamber. The shield is then moved away from its initial position whereupon both the vanadium and gallium metals are coevaporated on the substrate to produce a superconductive vanadium-gallium metallic film thereon. The employment of the shield is particularly advantageous when it is desired to produce a thin metallic film of superconductive vanadium-gallium metal on the substrate. Of course, such operation may be used in the production of thicker substrate films.

I discovered that vanadium metal and gallium metal could be coevaporated simultaneously under the above conditions to form a superconductive metallic film which exhibits superconductivity when cooled below the critical temperature of the corresponding bulk material.

I found further that if the substrate temperature was above 500° C. during the coevaporation of vanadium and gallium in a ratio of 3 to higher than 1 under the above conditions, vanadium-gallium, $V_3Ga$, was formed. The compound $V_3Ga$ is formed in bulk only at a temperature greater than 1400° C. I found also that during a coevaporation of vanadium and gallium, a ratio less than 1 to 3 of gallium to vanadium formed a superconductive metallic film in which the pure element vanadium was present in addition to any compounds of vanadium and gallium. Both of the above metallic films, which are coevaporated simultaneously, exhibit superconductivity when cooled below the critical temperature of the corresponding bulk material.

In the operation of the apparatus shown in FIGURE 1 of the drawing, a plurality of tungsten substrates 24 are positioned adjacent one another on a Vycor member 22 having a heating wire 23 embedded therein. Member 22 is positioned on an electrically insulated block 21 which is supported on a metallic member 20. A tungsten wire 41 with a V-shaped configuration having a loop at its end is attached to arms 27 of rods 26 and 40. A vanadium rod 62 is positioned in portion 61 of L-shaped member 59 supported on rod 58. Arm 27 of rod 48 supports a high temperature wire screen 49 of molybdenum having a central aperture 50 therein. The free end of rod 62 extends through aperture 50 and the aperture formed by wire 41 and is positioned slightly above or within the loop of wire 41. A globule 73 of gallium is supported within the heating coil portion of molybdenum wire 72. Bell jar 16 is positioned on rubber gasket 15 and its inner edge is adjacent to center portion 12 of base member 11.

Pump 18 evacuates chamber 19 through exit line 17 to a pressure in the range of $1\times10^{-9}$ to $5\times10^{-5}$ millimeters of mercury. Rod 48 is connected to the negative terminal of power source 53 by terminal 52 and switch 55 to provide a negative potential of minus 500 volts on the wire screen 49. Rod 58 is connected to the positive terminal of a 300 milliamperes, 3000 volts variable direct current supply 66 which is grounded from its opposite terminal. Transformer 46 is energized to provide, for example, a 16 volt, 18 ampere source of electrons. Switch 44 is closed to contact terminal 43 whereupon the power from transformer 46 heats wire 41 to emit electrons. Switch 68 is closed providing a potential of the order of 150 volts on rod 62. Switch 55 is closed providing a negative potential of minus 500 volts on screen 49.

The electrons from heated wire 41 are accelerated to the tip of rod 62 by the high voltage between rod 62 and wire 41. Screen 49 causes the electrons to focus on the tip portion of rod 62 which is heated to its melting point whereupon globule 63 forms at the tip of rod 62. Maximum rate of evaporation is obtained by maintaining globule 63 at its melting point. A portion of vanadium metal from globule 63 of rod 62 is evaporated rapidly over a large area including substrates 24. The initial evaporated metal getters oxygen and oxygen containing compounds within chamber 19.

Switch 78 is closed by contacting terminal 75 to produce a power supply of, for example, 5 volts, 15 amperes from transformer 77 to heat molybdenum wire 72 and particularly its coil containing gallium globule 73 which wire 72 is supported by arms 27 on rods 26 and 71. The gallium is heated to its evaporation temperature. An additional portion of vanadium metal is evaporated and condensed on substrates 24. The molten gallium is coevaporated and condensed simultaneously with the molten vanadium on the substrates thereby forming directly on the substrates a superconductive vanadium-gallium metallic film.

Switches 44, 55, 68 and 78 are opened and chamber 19 is allowed to cool to room temperature. After chamber 19 is returned to atmospheric pressure, bell jar 16 is removed therefrom. The substrates 24 with superconductive vanadium-gallium metallic films thereon are then removed from chamber 19.

The operation of apparatus 10 is also performed in the above manner with additional gettering of oxygen and oxygen containing compounds during the evaporation of the superconductive metallic film onto substrates 24. This is accomplished by pivoting rod 81 supported in insulated sleeve 80 by any suitable means (not shown) to position a molybdenum shield 83 between substrates 24 and rod 62. Wire 41 is heated to melt globule 63 as described above and vanadium metal from rod 62 is evaporated rapidly on the interior surfaces of chamber 19 including shield 83 and thereby increasing the amount of gettering of oxygen and oxygen containing compounds therein. The shield is then removed or moved away from its initial position so that rapid evaporation of an additional portion of vanadium metal and coevaporation of a portion of gallium form a superconductive metallic film on substrates 24.

In the above operation of the apparatus, a superconductive metallic compound of $V_3Ga$ is formed on substrates 24 by coevaporating vanadium and gallium while the substrates are maintained at a temperature above 500° C. In the above operation of the apparatus, a superconductive metallic film is formed when a ratio less than 1 to 3 of gallium to vanadium is coevaporated. This latter film has present therein the pure element vanadium in addition to any compounds of vanadium and gallium. This latter superconductive metallic film is also a useful film which exhibits superconductivity when cooled below the critical temperature of the corresponding bulk material.

As is shown in FIGURE 2 of the drawing, a tungsten substrate 24 has a superconductive metallic compound film 85 containing vanadium-gallium, $V_3Ga$, coevaporated thereon. This coevaporation is accomplished in the apparatus shown in FIGURE 1 of the drawing.

In FIGURE 3 of the drawing, a cylinder 86 of tungsten having a central aperture 87 therethrough has a superconductive metallic compound film 88 containing vanadium-gallium, $V_3Ga$, on its exterior side wall. This film is coevaporated on the cylinder in the apparatus shown in FIGURE 1 of the drawing. During the process, cylinder 86 is rotated on its axis.

Figure 4:
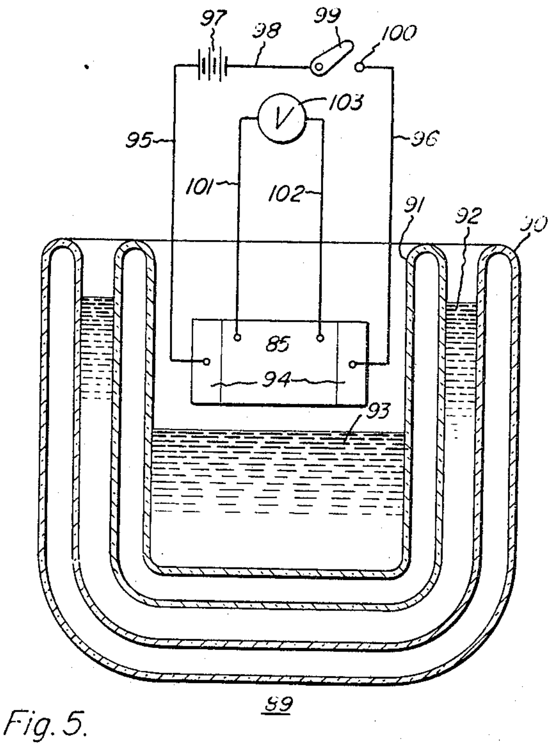
FIGURE 4 is a sectional view of apparatus to determine superconductivity of a metallic film.

In FIGURE 4 of the drawing, there is shown an insulated container 89 having an exterior insulated vessel 90, an inner insulated vessel 91 separated by liquid nitrogen 92. Within inner vessel 91, there is contained liquid helium 93. A substrate 24 having a superconductive film 85 containing vanadium-gallium, $V_3Ga$, thereon is then positioned in a region of helium vapors above liquid helium 93 whereby substrate 24 is maintained at a temperature of above 5° K., the critical temperature of pure bulk vanadium-gallium, $V_3Ga$. At opposite ends of superconductive film 85, there is provided a layer of indium solder 94. A pair of leads 95 and 96 are connected to the opposite layers of indium layers 94. Lead 95 is connected to a battery 97 which has a lead 98 from its opposite terminal to a switch 99. Lead 96 has a terminal 100 adapted to be contacted by switch 99. A second pair of leads 101 and 102 are soldered to the superconductive film 85 on substrate 24. These leads are connected to a voltmeter 103.

In the operation of the test apparatus shown in FIGURE 4 of the drawing, switch 99 is closed by contacting terminal 100. Voltmeter 103 provides a reading which indicates whether the superconductive metallic compound film is or is not superconducting at a temperature of above 5° K. If the voltmeter continues a zero reading, the superconductive film containing vanadium-gallium, $V_3Ga$, is then known to be superconducting at a temperature of above 5° K., the critical temperature of the corresponding bulk vanadium-gallium, $V_3Ga$.

Figure 5:
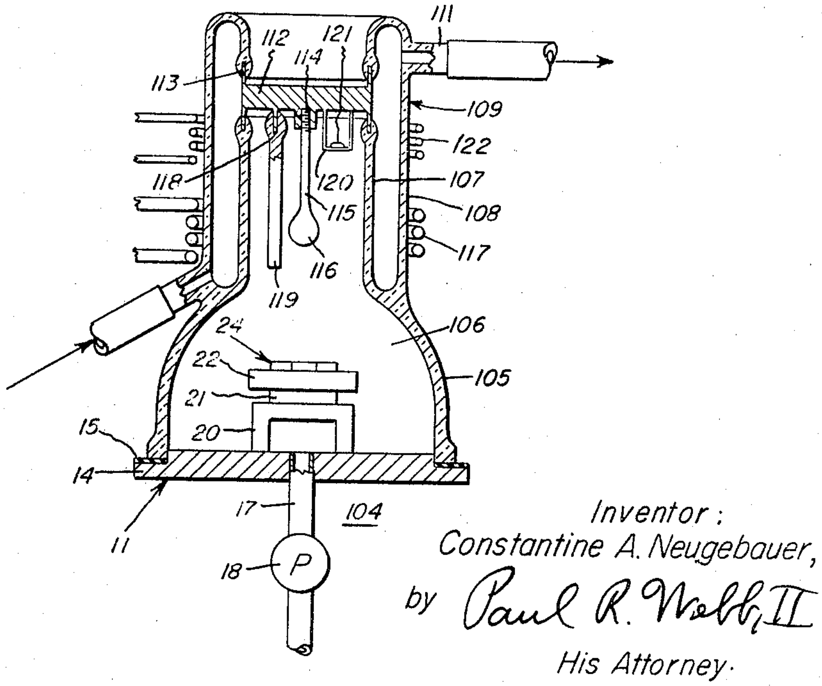
FIGURE 5 is a sectional view of modified apparatus including induction heating.

In FIGURE 5 of the drawing, there is shown modified apparatus 104 for forming superconductive metallic films on substrates. Metal base 11 has a center portion 12 with central aperture 13 therein and an outer rim 14 on which is positioned a gasket 15. A glass bell jar 105 is positioned on gasket 15 adjacent the edge of center portion 12 of base 11. An evacuation line 17 is connected to aperture 13 and to pump 18 to evacuate a chamber 106 defined by bell jar 105 and center portion 12 of base 11.

A metal member 20 including support legs is positioned over aperture 13. A block 21, such as a quartz, mica or Vycor, is located on the top surface of member 20 to provide electrical insulation. A member 22 of quartz, mica or Vycor, which has a plurality of heating wires (not shown) embedded therein, is positioned on the upper surface of block 21 and extends beyond the edges of member 20 to prevent shorting during operation of the apparatus. A plurality of metal substrates 24 are arranged on the upper surface of member 22. Such substrates can be of various metallic and non-metallic materials. For example, tungsten, stainless steel, quartz, mica, magnesium oxide, and soda-lime glass are suitable.

The upper portion of bell jar 105 with a diameter less than its lower portion has an inner wall 107 and an outer wall 108 forming a condenser 109. Water is supplied to condenser 109 through water inlet 110 and discharged from water outlet 111. A metal support bracket 112 has a rim 113 at its periphery which is bonded by any suitable means to inner wall 107 of condenser 109. Bracket 112 has a threaded portion 114 which positions the threaded end of a rod 115 of vanadium. At the free end of rod 115 there is shown a globule 116 of vanadium which is formed during a previous melting of the tip of rod 115. An induction coil 117 surrounds a portion of the exterior wall of condenser 109 adjacent the tip of rod 115. A projection 118 from bracket 112 carries a glass rod 119 which is at least the length of rod 115. A molybdenum support 120 is attached to bracket 112 and positions a globule 121 of gallium. An induction coil 122 surrounds a portion of the exterior wall of condenser 109 and encloses tin globule 121 therein.

Induction coil 117 is provided to heat and melt at least a part of the superconductive metal in rod 115. Induction coil 122 is provided to heat and melt at least a part of tin globule 122. For simplification, the apparatus and circuitry for heating wires 23 in member 22, and shield 83 with its associated equipment, which are shown in FIGURE 1, are not repeated in FIGURE 5. However, it is to be understood that these parts of the apparatus which are disclosed in FIGURE 1 of the drawing and described above are also applicable to the apparatus shown in FIGURE 5.

In the operation of the apparatus shown in FIGURE 5 of the drawing, a plurality of tungsten substrates 24 are positioned adjacent one another on a Vycor member 22. Member 22 is positioned on an electrically insulated block 21 which is supported on a metallic member 20. A vanadium rod 115 is threaded in support bracket 112 and glass rod 119 is carried by this bracket. A globule of gallium 121 is positioned on support 120. Bell jar 105 is positioned on rubber gasket 15 and its inner edge is adjacent to center portion 12 of base member 11. The tip of rod 115 is positioned within and surrounded by induction coil 117 which is located around the exterior wall of condenser 109. Water is flowed through the condenser during operation to cool bell jar 105.

Pump 18 evacuates chamber 106 through exit line 17 to a pressure in the range of $1\times10^{-9}$ to $5\times10^{-5}$ millimeters of mercury. Induction coil 117 is energized from a variable power source (not shown) to heat and melt at least a part of the vanadium in rod 115 as shown, for example, by globule 116. A portion of the vanadium metal from globule 116 of rod 115 is evaporated over a large area including substrates 24. The initial portion of the evaporated metal getters oxygen and oxygen containing compounds within chamber 106. Glass rod 119 casts a shadow on the interior of inner wall 107 of condenser 109 to prevent a continuous annular deposit of metal on wall 107. In this manner, effective heating and melting of a portion of rod 115 is accomplished.

Induction coil 122 is energized from a power source (not shown) to heat and melt at least a part of the gallium metal of globule 121. An additional portion of the vanadium metal is evaporated and condensed on substrates 24. The molten gallium metal is coevaporated and condensed simultaneously with the first molten vanadium metal on the substrates thereby forming directly on the substrates a superconductive vanadium-gallium metallic film.

The induction heatings are terminated and the chamber 106 is allowed to cool to room temperature. After the chamber is returned to atmospheric pressure, bell jar 105 is removed therefrom. The substrates 24, with superconductive metallic films thereon, are then removed from chamber 106. Shield 83, which is also shown in FIGURE 1, can be employed in apparatus 104 during the formation of superconductive metallic films. The operation of apparatus 104 in FIGURE 5 may also be modified as described above concerning the modified methods employed in the apparatus shown in FIGURE 1.

A tungsten substrate 24, which is employed in apparatus 104, is shown in FIGURE 2 of the drawing wherein a superconductive metallic compound film 85 containing vanadium-gallium, $V_3Ga$, is coevaporated thereon. Tungsten cylinder 86, which is shown in FIGURE 3 of the drawing is employed in apparatus 104 to coevaporate, for example, a superconductive metallic compound film 88 containing vanadium-gallium, $V_3Ga$, on the exterior side wall of the cylinder. The test apparatus of FIGURE 4 is also used to determine whether the coevaporated film is superconducting at the critical temperature of the corresponding bulk material.

Examples of superconductive films formed on substrates in accordance with the methods of the present invention are as follows:

EXAMPLE I

Apparatus is set up in accordance with FIGURE 1 of the drawing. A plurality of quartz substrates are positioned on the electrically insulated heating member supported on the base member. A vanadium rod having a diameter of ¼ inch is employed as the high melting point superconductive metallic member from which vanadium is evaporated on the substrates. A gallium globule contained within a tungsten wire coil is employed as the second lower melting point superconductive metal. The bell jar is placed on the rubber gasket positioned on the rim of the base member. The chamber within the bell jar is evacuated by the pump to the pressure in the range of $1\times10^{-9}$ to $5\times10^{-5}$ millimeters of mercury. The substrates are positioned approximately 1½ inches from the end of the vanadium rod. The tungsten wire surrounding the end of the rod was heated from a 16 volt, 18 ampere power source. A 300 milliamperes, 3000 volts D.C. variable power supply was connected to the vanadium rod and the molybdenum wire screen surrounding the rod which was maintained at a negative potential of minus 500 volts to provide electron bombardment heating of the vanadium rod. A molybdenum shield is positioned between the end of the vanadium rod and the substrates. The evaporation was continued for a period of several minutes to getter oxygen and oxygen containing compounds within the chamber. The substrates are heated to a temperature of 600° C. The gallium globule is heated to its evaporation temperature. The shield is removed. The evaporation of vanadium is continued with its condensation on the substrates while the gallium is coevaporated and condensed simultaneously in a ratio of about 1 to 1 for a period of 5 minutes on the substrates, forming a metallic film thereon.

This heating is then discontinued. The chamber is returned to atmospheric pressure. The bell jar is removed from the rubber gasket to provide access to the substrates therein. Each of these substrates has a metallic film thereon which is about one micron in thickness. Examination discloses the film to be 30 percent $V_3Ga$ and 70 percent elemental vanadium. Subsequently, one of these coated substrates is tested in the apparatus shown in FIGURE 4 of the drawing. Prior to testing this substrate, a coating of indium solder is applied at opposite ends on the surface of the film. A pair of leads are connected to the respective indium solder portions and to a battery and associated switch. A second pair of leads are soldered at spaced-apart points on the film. These leads are connected to a voltmeter. The substrate with its film thereon is then positioned in a region of helium vapors above the liquid helium in an insulated container whereby the substrate is maintained at a temperature of above 5° K. The switch is closed to activate the battery to provide a flow of current through the superconductive film. The voltmeter registers zero volts disclosing that the film is superconductive.

EXAMPLE II

Apparatus is set up in accordance with FIGURE 1 of the drawing. A plurality of quartz substrates are positioned on the electrically insulated heating member supported on the base member. A vanadium rod having a diameter of ¼ inch is employed as the high melting point superconductive metallic member from which vanadium is evaporated on the substrates. A gallium globule contained within a tungsten wire coil is employed as the second lower melting point superconductive metal. The bell jar is placed on the rubber gasket positioned on the rim of the base member. The chamber within the bell jar is evacuated by the pump to the pressure in the range of $1\times10^{-9}$ to $5\times10^{-5}$ millimeters of mercury. The substrates are positioned approximately 1½ inches from the end of the vanadium rod. The tungsten wire surrounding the end of the rod is heated from a 16 volt, 18 ampere power source. A 300 milliamperes, 3000 volts D.C. variable power supply is connected to the niobium rod and the molybdenum wire screen surrounding the rod which is maintained at a negative potential of minus 500 volts to provide electron bombardment heating of the vanadium rod. A molybdenum shield is positioned between the end of the vanadium rod and the substrates. The evaporation is continued for a period of several minutes to getter oxygen and oxygen containing compounds within the chamber. The substrates are heated to a temperature of 600° C. The gallium globule is heated to its evaporation temperature. The shield is removed. The evaporation of vanadium is continued with its condensation on the substrates while the gallium is coevaporated and condensed simultaneously in a ratio of greater than 3 to 1 of gallium to vanadium for a period of 5 minutes on the substrates forming a metallic film thereon.

This heating is then discontinued. The chamber is returned to atmospheric pressure. The bell jar is removed from the rubber gasket to provide access to the substrates therein. Each of these substrates has a metallic film thereon which is about one micron in thickness. Examination discloses the film to be 50 percent $V_3Ga$ and 50 percent elemental vanadium. Subsequently, one of these coated substrates is tested in the apparatus shown in FIGURE 4 of the drawing. Prior to testing this substrate, a coating of indium solder is applied at opposite ends on the surface of the film. A pair of leads are connected to the respective indium solder portions and to a battery and associated switch. A second pair of leads are soldered at spaced-apart points on the film. These leads are connected to a voltmeter. The substrate with its film thereon is then positioned in a region of helium vapors above the liquid helium in an insulated container whereby the substrate is maintained at a temperature of above 5° K. The switch is closed to activate the battery to provide a flow of current through the superconductive film. The voltmeter registers zero volts disclosing that the film is superconductive.

What I claim as new and desire to secure by Letters Patent of the United States is:

1. A method of forming a superconductive $V_3Ga$ metallic film on a substrate which comprises positioning at least one substrate within a chamber, evacuating said chamber to a pressure in the range of $1\times10^{-9}$ to $5\times10^{-5}$ millimeters of mercury, positioning a metal member containing vanadium within said chamber, positioning a gallium metal within said chamber, heating at least a part of said vanadium metal member to at least its melting point, evaporating an initial portion of the resulting molten vanadium metal within said chamber thereby gettering oxygen and oxygen containing compounds therein, heating said gallium metal to its evaporation temperature, heating said substrate to a temperature above 500° C., subsequently evaporating an additional portion of said molten vanadium metal and condensing said molten vanadium metal on said substrate, and coevaporating at least a portion of said gallium metal and condensing said gallium metal simultaneously on said substrate in a ratio higher than 1 to 3 to vanadium thereby forming on said substrate a superconductive $V_3Ga$ metallic film.

2. A method of forming a superconductive $V_3Ga$ metallic film on a substrate which comprises positioning at least one substrate within a chamber, evacuating said chamber to a pressure in the range of $1\times10^{-9}$ to $5\times10^{-5}$ millimeters of mercury, positioning a metal member containing vanadium within said chamber, positioning gallium metal within said chamber, positioning a shield between said substrate and said vanadium metal member, heating at least a part of said vandium metal member to at least its melting point, evaporating an initial portion of the resulting molten vanadium metal within said chamber thereby gettering oxygen and oxygen containing compounds therein, removing said shield, heating said gallium metal to its evaporation temperature, heating said substrate to a temperature above 500° C., subsequently evaporating an additional portion of said molten vanadium metal and condensing said molten vanadium metal on said substrate, and coevaporating at least a portion of said gallium metal and condensing said gallium metal simultaneously on said substrate in a ratio higher than 1 to 3 to vanadium thereby forming on said substrate a superconductive $V_3Ga$ metallic film.

3. A method of forming a superconductive vanadium-gallium and vanadium metallic film on a substrate which comprises positioning at least one substrate within a chamber, evacuating said chamber to a pressure in the range of $1\times10^{-9}$ to $5\times10^{-5}$ millimeters of mercury, positioning a metal member containing vanadium within said chamber, positioning gallium metal within said chamber, heating at least a part of said vanadium metal member to at least its melting point, evaporating an initial portion of the resulting molten vanadium metal within said chamber thereby gettering oxygen and oxygen containing compounds therein, heating said gallium metal to its evaporation temperature, subsequently evaporating an additional portion of said molten vanadium metal and condensing said molten vanadium metal on said substrate, coevaporating at least a portion of said gallium metal and condensing said gallium metal simultaneously on said substrate in a ratio less than 1 to 3 of said gallium metal to said vanadium metal thereby forming on said substrate a superconductive vanadium-gallium and vanadium metallic film.

References Cited

UNITED STATES PATENTS

| | | | |
|---|---|---|---|
| 3,091,556 | 5/1963 | Behrndt et al. | 117—213 |
| 3,215,569 | 11/1965 | Kneip et al. | 148—133 |

RICHARD O. DEAN, Primary Examiner

U.S. Cl. X.R.

29—194; 75—135; 117—107, 227